United States Patent
Isker et al.

(10) Patent No.: US 6,889,592 B2
(45) Date of Patent: May 10, 2005

(54) FIXTURE FOR MOUNTING WEAPONS, AND METHOD OF USING

(75) Inventors: John D. Isker, Sun City, CA (US); Michael L. Wells, Canyon Country, CA (US); Daniel P. Brown, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/411,169

(22) Filed: Apr. 9, 2003

(65) Prior Publication Data

US 2004/0216596 A1 Nov. 4, 2004

(51) Int. Cl.[7] ................................................. B64D 1/04
(52) U.S. Cl. ........................ 89/1.53; 89/1.54; 89/1.61; 89/37.19
(58) Field of Search ................................. 89/1.52, 1.53, 89/1.54, 1.58, 1.59, 1.61, 1.51, 37.19, 37.22

(56) References Cited

U.S. PATENT DOCUMENTS

| | | | | |
|---|---|---|---|---|
| 2,366,704 A | * | 1/1945 | Austin et al. ............... | 89/37.03 |
| 4,600,171 A | * | 7/1986 | Kalisz ..................... | 244/137.1 |
| 4,606,517 A | | 8/1986 | Adams | |
| 5,092,542 A | * | 3/1992 | Ellis et al. ................ | 244/137.4 |
| 5,438,404 A | | 8/1995 | Hamilton et al. | |
| 6,176,167 B1 | * | 1/2001 | Sanderson .................. | 89/1.54 |
| 6,250,195 B1 | * | 6/2001 | Mendoza et al. ............ | 89/1.59 |
| 6,688,209 B1 | * | 2/2004 | McMahon et al. ........... | 89/1.59 |

FOREIGN PATENT DOCUMENTS

| | | | | |
|---|---|---|---|---|
| DE | 39 05 396 A1 | | 8/1990 | |
| GB | 2 229 489 A | | 9/1990 | |
| IT | 293144 | * | 2/1932 | ................. 89/1.58 |

* cited by examiner

Primary Examiner—Stephen M. Johnson
(74) Attorney, Agent, or Firm—John E. Gunther; Leonard A. Alkvo; William C. Schubert (57) ABSTRACT

An adjustable fixture for mounting any of a plurality of weapon sets to an aircraft includes a bracket and lugs that are adjustably mechanically coupled to the bracket. The fixture may be adjusted once, to achieve proper orientation relative to the aircraft for boresighting, and may thereafter allow switching of weapon sets, either of the same type or of different types, without a need for re-boresighting. Quick-release fasteners, such as quick-release pins, may be used to couple the weapon sets to the fixture, to allow for easy and rapid change of weapon stores. The fixture may include one or more adapters used to allow various kinds of weapon sets to be coupled to the bracket.

27 Claims, 7 Drawing Sheets

FIXTURE FOR MOUNTING WEAPONS, AND METHOD OF USING

BACKGROUND OF THE INVENTION

1. Field of the Invention

The invention relates to devices and methods for mounting weapons on aircraft, such as rotary winged aircraft.

2. Description of the Related Art

In order to control weapons, such as missiles or rockets, fired from launchers or pods mounted on an aircraft, it is important to properly align the pod or launcher with respect to the aircraft. This alignment involves achieving a designed orientation relationship between a bore sight of the launcher and the aircraft. This procedure is referred to herein as "boresighting." A number of methods exist for accomplishing boresighting. For example, a target may be placed at a pre-selected distance from the aircraft. A bore scope or other sighting device may be inserted or otherwise coupled to the weapon system pod or launcher. The positioning and/or orientation of the pod or launcher may then be adjusted to achieve a desired location of the scope of other sighting device on the target. Further details regarding boresighting methods may be found in U.S. Pat. No. 5,438,404, which is herein incorporated by reference in its entirety.

Figure 1:
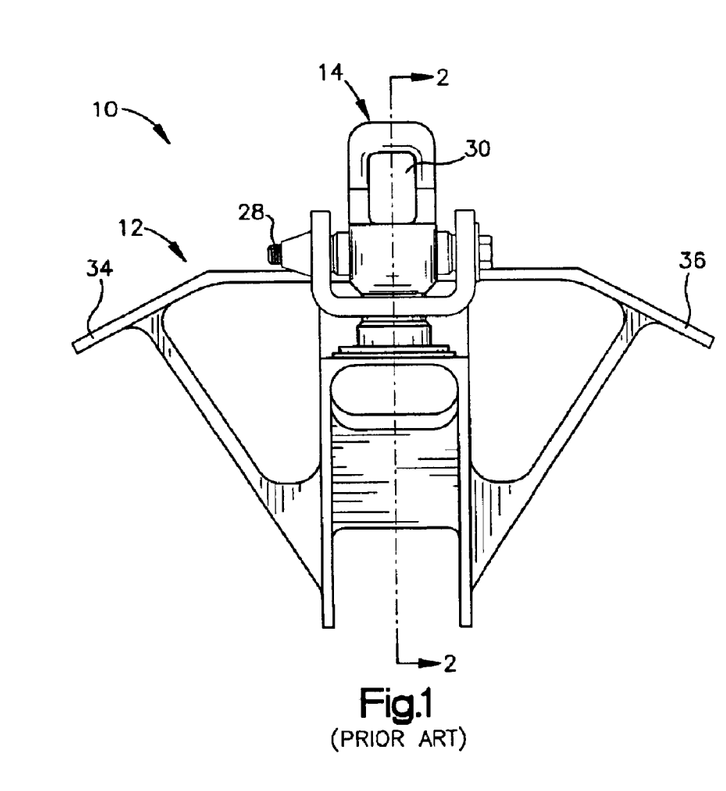
FIG. 1 is an end view of a prior art weapon set mount.

The weapon system pod or launcher may have a mechanical adjustment system incorporated therewithin to allow adjustment of the weapon system relative to the aircraft. An example of a prior art weapon set mount is shown in FIG. 1. The weapon set mount 10 shown therein has a weapon set mount body 12, and a lug 14 that is adjustable in two dimensions relative to the body 12. An adjustment mechanism 16 for adjusting the lug 14 relative to the body 12 includes a spring 20, a retainer 22 to aid in retaining the spring, an adjustment sleeve 24, and an adjustment nut 28. Rotation of the adjustment sleeve 24 raises and lowers the lug 14. Rotation of the adjustment nut 28 moves the lug 14 left and right. A lug opening 30 of the lug 14 interfaces with a standard mounting hook, rod, or bar on the aircraft, and extensions 34 and 36 interface with anti-sway braces of the aircraft to prevent swaying of the weapon set. Two mounts 10 are utilized to mount a missile launcher, the illustrated example being from a TOW launcher. The lugs 14 of each of the mounts 10 may be individually adjusted to adjust orientation of the TOW launcher relative to an aircraft such as a rotary wing aircraft. The mount 10 also includes a forked end 40 having a bushing 42 about a hole 44. The forked end 40 is used for coupling multiple launchers together, for example, one on top of another. It will be appreciated that other types of weapon sets may have other sorts of interfaces for interfacing with a common aircraft mount, and/or adjusting boresight for orientation relative to the aircraft. Further, it will be appreciated that some weapon sets or other devices couplable to the aircraft may not need boresighting.

One disadvantage with the current system is the need to re-boresight every time a new weapon set is installed. Boresighting is a relatively lengthy, labor-intensive process, and it will be appreciated that delays required by re-boresighting may adversely affect mission turn-around times, particularly where a partial or complete switch of weapon sets is required. For example, if a switch is required from one to another type of weapon, such as from TOW missiles to Hellfire missiles, the re-boresighting process may be needed before a mission is commenced. As a result, there may be an unacceptable time between missions and/or flexibility in configuring aircraft may be adversely affected.

Accordingly, it will be appreciated that improvements in systems and/or methods may be desirable.

SUMMARY OF THE INVENTION

According to an aspect of the invention, an adjustable fixture may allow coupling of a variety of weapon sets to an aircraft without need for re-boresighting.

According to another aspect of the invention, an adjustable fixture may allow a variety of weapon sets to be quickly coupled and uncoupled through use of quick-release fasteners, such as quick-release pins.

According to yet another aspect of the invention, an adjustable fixture may be left connected to an aircraft mounting as any of a variety of weapon sets are coupled to it and decoupled from it. The fixture may be adjusted such that the weapon sets are properly aligned without need for re-boresighting as new weapon sets are coupled to the mounting fixture.

According to still another aspect of the invention, an adjustable fixture for mounting any of a plurality of weapon sets to an aircraft without need for re-boresighting, includes: a bracket; and one or more mounting lugs adjustably mechanically coupled to the bracket. The mounting lugs include aircraft-fixture connection points configured to mechanically connect to the aircraft. The bracket includes fixture-weapon connection points configured to mechanically couple to the weapon sets via quick-release fasteners. The lugs are adjustable relative to the bracket for adjusting orientation of the fixture-weapon connection points relative to the aircraft-fixture connection points.

According to a further aspect of the invention, an adjustable fixture for mounting any of a plurality of weapon sets to an aircraft without need for re-boresighting, includes: a bracket; and one or more mounting lugs adjustably mechanically coupled to the bracket. The mounting lugs include aircraft-fixture connection points configured to mechanically connect to the aircraft. The bracket includes fixture-weapon connection points configured to mechanically couple to the weapon sets via quick-release pins. The lugs are adjustable relative to the bracket for adjusting orientation of the fixture-weapon connection points relative to the aircraft-fixture connection points. The bracket includes fastener-receiving holes at opposite ends, for receiving the quick-release pins therethrough. The bracket includes bracket extensions for interfacing with anti-sway brackets of the aircraft, to thereby control sway (or roll) of the fixture relative to the aircraft. The bracket includes anti-sway outriggers for interacting with the weapon set to control sway (or roll) of the weapon set relative to the fixture. The mounting lugs are independently adjustable in at least two dimensions relative to the bracket. Thus the pitch, yaw and roll angles of the weapon launcher can be adjusted with the fixture.

According to a still further aspect of the invention, a method of mounting a weapon set on an aircraft in a desired orientation includes: coupling an adjustable mounting fixture to a mount on the aircraft; boresighting to place the mounting fixture in a desired orientation relative to the aircraft; and following the boresighting, coupling the weapon set to the mounting fixture, wherein the weapon set is thereby placed in the desired orientation, without need for re-boresighting.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

An adjustable fixture for mounting any of a plurality of weapon sets to an aircraft includes a bracket and lugs that are adjustably mechanically coupled to the bracket. The fixture may be adjusted once, to achieve proper orientation relative to the aircraft for boresighting, and may thereafter allow switching of weapon sets, either of the same type or of different types, without a need for re-boresighting. Quick-release fasteners, such as quick-release pins, may be used to couple the weapon sets to the fixture, to allow for easy and rapid change of weapon stores. The fixture may include one or more adapters used to allow various kinds of weapon sets to be coupled to the bracket.

Figure 3:
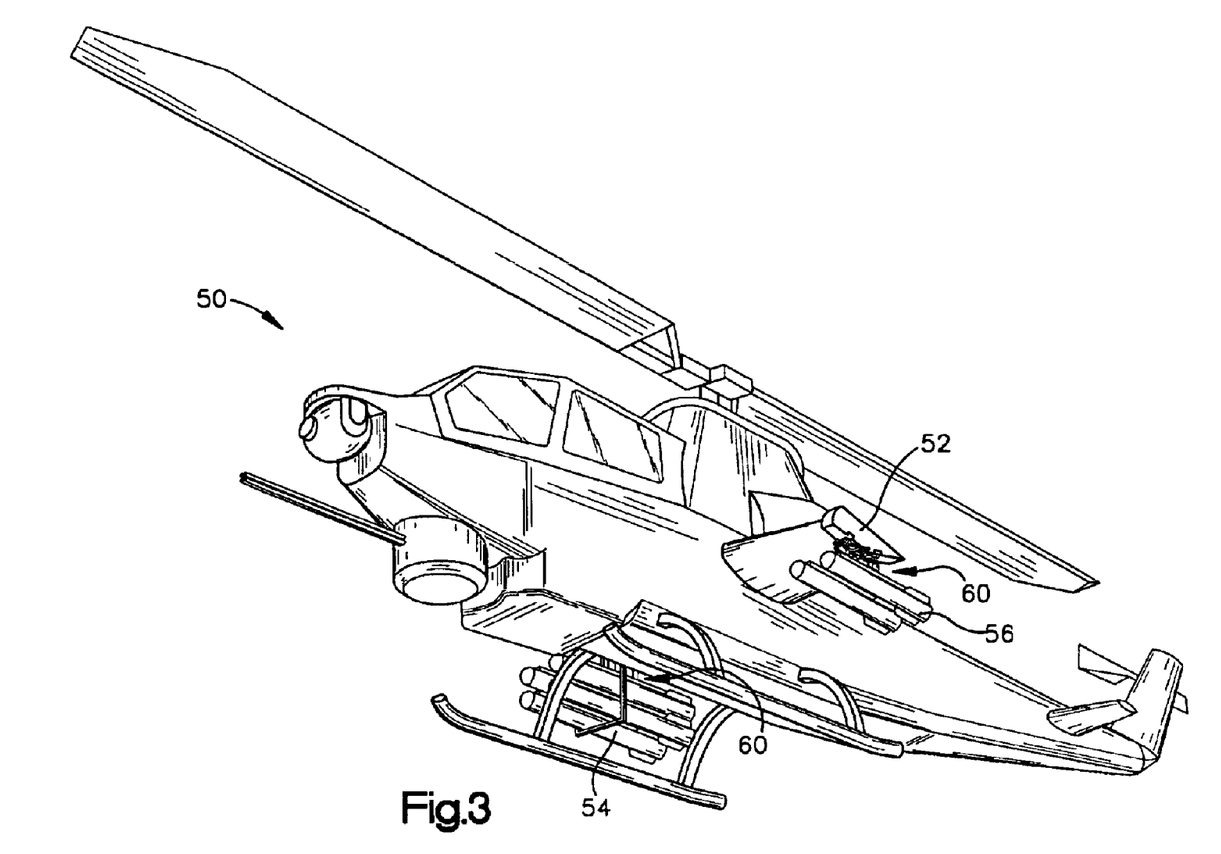
FIG. 3 is a perspective view of a rotary aircraft that includes the mounting fixture of the present invention.

Referring to FIG. 3, a rotary aircraft 50 has wings such as the wing 52, to which a first weapon set 54 (e.g., a TOW missile launcher) and a second weapon set 56 (e.g., a Hellfire missile launcher) are coupled, via fixtures 60. As described in greater detail below, the fixtures 60 include adjustment mechanisms to allow one portion of the fixture to be mechanically adjusted relative to another, so as to allow the connection points between fixtures 60 and the weapon sets 54 and 56 to be adjusted so that the weapon sets 54 and 56 are properly boresighted.

Although the fixture 60 is described below in terms of connection of missile weapon sets to a rotary aircraft, it will be appreciated that a fixture such as that described below may more broadly be employed to receive a variety of weapon sets, for example, including missile launchers of various types, rocket pods, and/or gun pods, while mounted to any of a variety of suitable aircraft, such as including rotary aircraft and airplanes.

Figure 2:
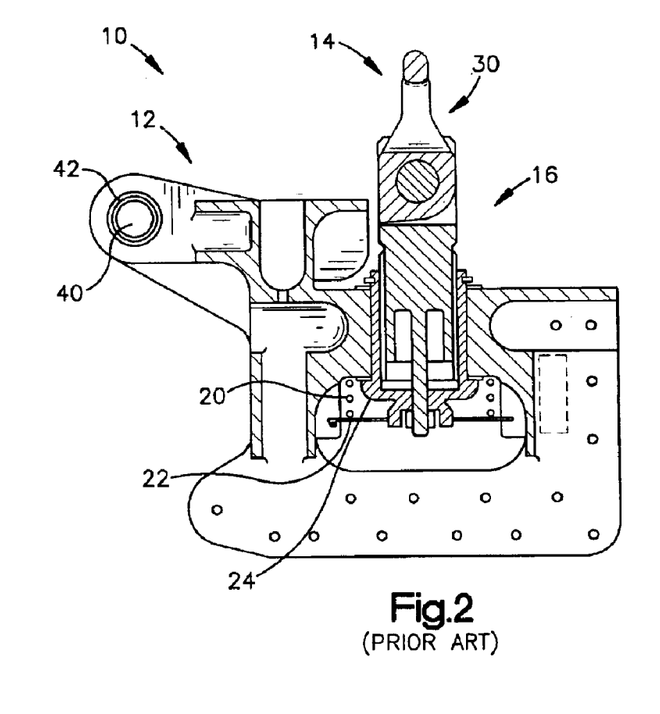
FIG. 2 is a cross-sectional view along section 2—2 of FIG. 1.
Figure 4:
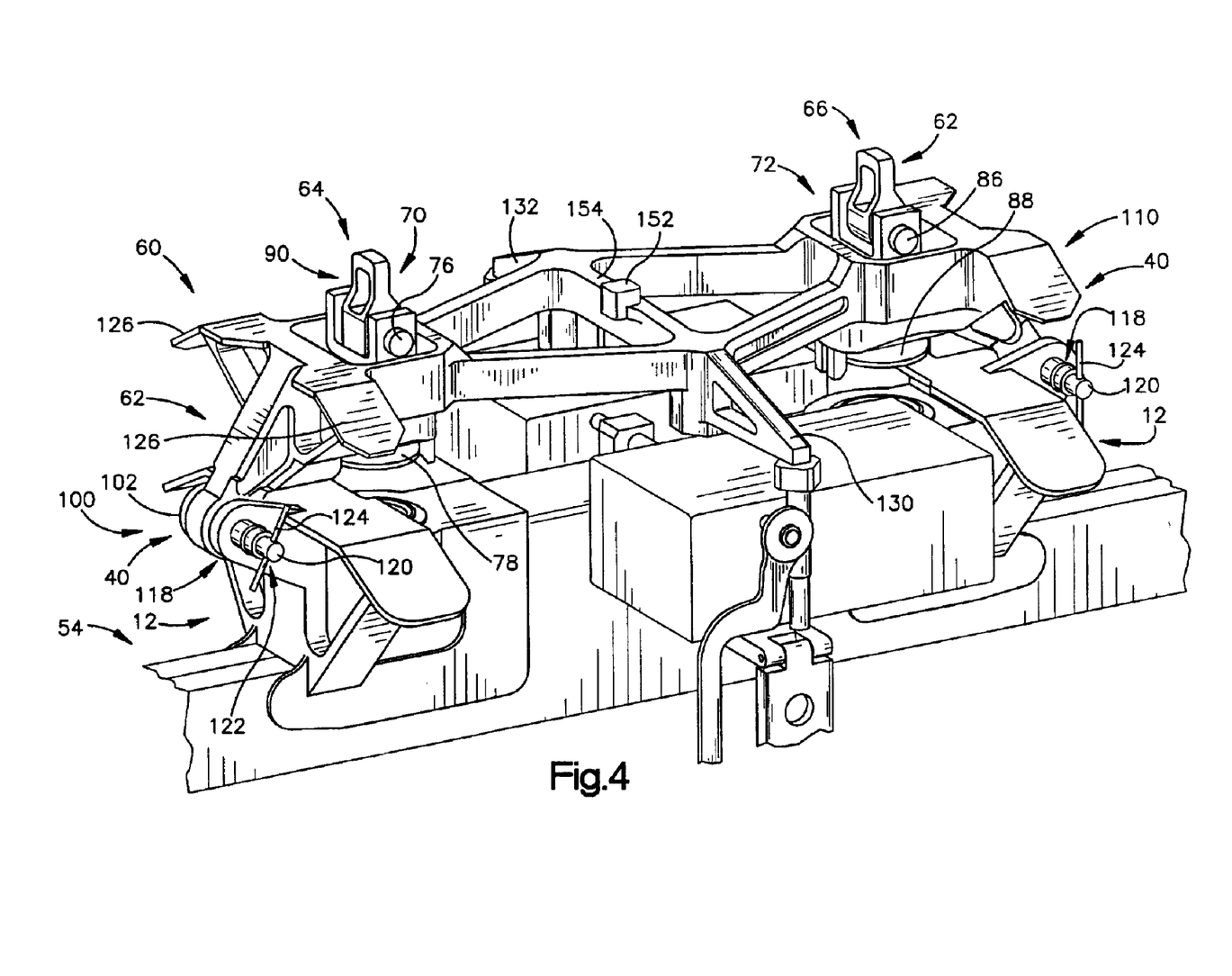
FIG. 4 is an oblique view showing details of the connection between the mounting fixture of the present invention, and a TOW missile launcher.

FIG. 4 provides a more detailed view of the connection between the fixture 60 and the first weapon set 54. The first weapon set 54 includes a pair of mounts 10, shown in FIGS. 1 and 2, and described above. The fixture 60 includes a bracket 62 and a pair of lugs 64 and 66 that are adjustable relative to the bracket 62. Thus, the bracket 62 may have adjustment mechanisms 70 and 72 for individually adjusting the position of the lugs 64 and 66 relative to the bracket 62. The lugs 64 and 66 may be similar to the lug 14 shown in FIGS. 1 and 2 and described above. The adjustment mechanisms 70 and 72 for adjusting the lugs 64 and 66 relative to the bracket 62, may also be similar to the adjustment mechanism 16 described above for adjusting position of the lug 14 relative to the weapon set mount body 12. Thus, the adjustment mechanism 70 may have an adjustment nut or knob 76, and an up-down adjustment sleeve 78. Similarly, the adjustment mechanism 72 may have an adjustment nut or knob 86 and an up-down adjustment sleeve 88. The lugs 64 and 66 have respective lug openings 90 and 92, which provide connection points for connecting to mounting hardware of the wing 52 of the aircraft 50.

Figures 5, 6:
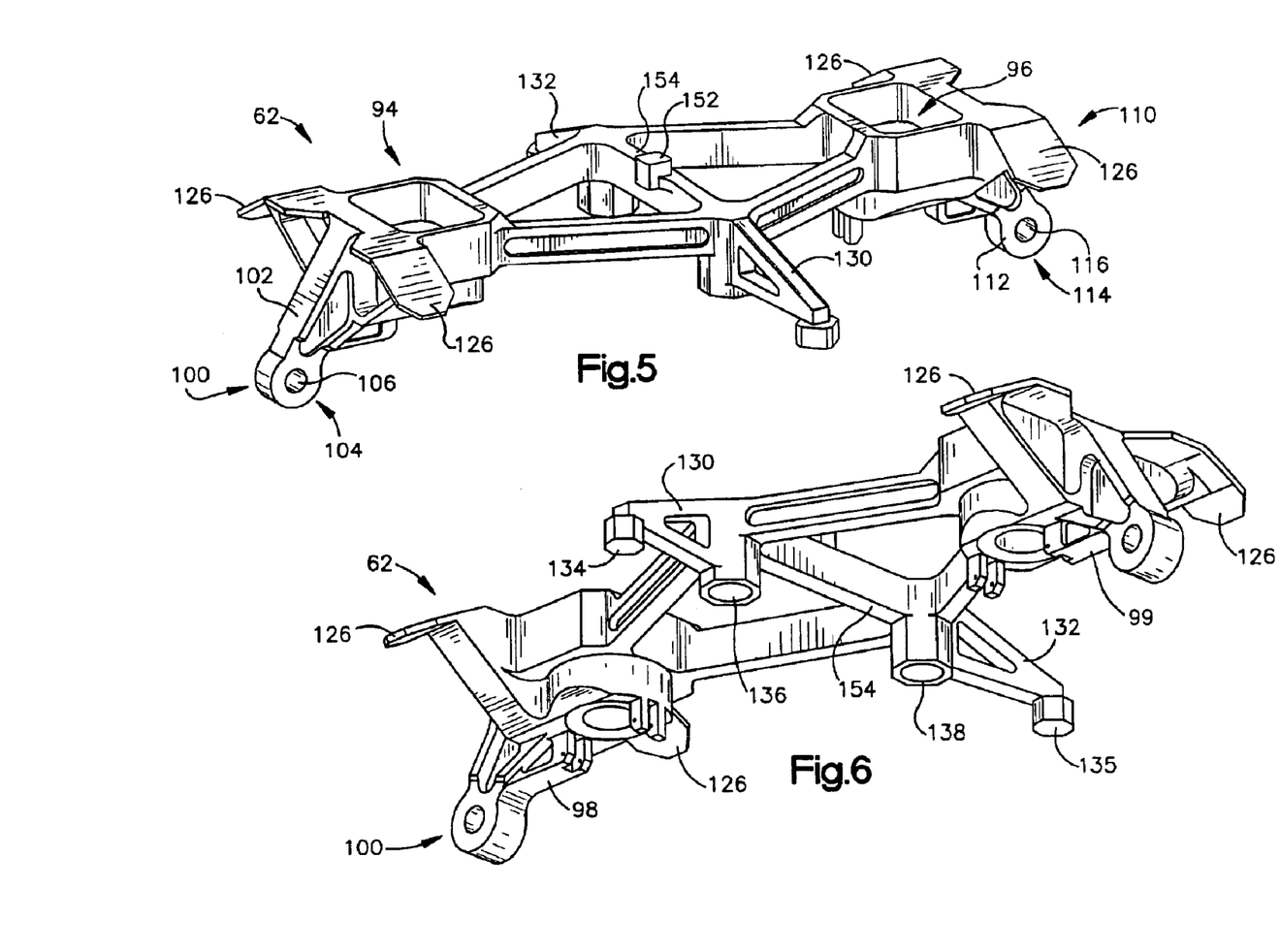
FIGS. 5 and 6 are top and bottom oblique views of the bracket used in the mounting fixture of FIG. 4.

Referring now in addition to FIGS. 5 and 6, the bracket 62 has lug-receiving holes 94 and 96 for receiving the respective lugs 64 and 66. The bracket has surfaces 98 and 99, which may rest on corresponding parts of the mount bodies 12 (FIG. 1) when the bracket 62 is placed on the mount bodies 12 as shown in FIG. 4.

At a first end 100 of the bracket, a first end protrusion 102 includes a fastener-receiving hole 104 and a bushing 106. Similarly, on a second end 110 of the bracket 62, there is a second end protrusion 112, also having a fastener-receiving hole 114 with a bushing 116 therein. The protrusions 102 and 112 interface with the forked ends 40 of the weapon set mount bodies 12 (FIGS. 1 and 4). A quick-release fastener 118 such as a quick-release pin may be inserted through the holes 44 of the weapon set mount 10 and the fastener-receiving hole 104 of the bracket 62, for example, to secure one end of the weapon set 54 to the bracket 62. The quick-release fastener 118 may be a pin of suitable conventional design, such as that shown in FIG. 4, having a pin body 120 with a hole 122 therethrough for receiving a cotter pin 124. It will be appreciated that any of a variety of suitable releasable fasteners may be employed, for example, a suitable bolt and lock nut. An example of a quick-release pin is Mil-Spec part number MS17988.

The bracket 62 has bracket extensions 126. The bracket extensions 126 may correspond in position to the extensions 34 and 36 (FIGS. 1 and 4) of the weapon set mount 10. As described in greater detail below, the bracket extensions 126 are configured to interface with sway braces and adjustable sway members of the aircraft mounting rack, in order to control swaying in the adjustable fixture 60 and the weapon set 54. The bracket 62 includes anti-sway outriggers 130 and 132, with corresponding contact surfaces 134 and 135 at their distal ends for contacting portions of the weapon set 54 (FIG. 4). The anti-sway outriggers 130 and 132 aid in preventing sway between the bracket 62 and the weapon set 54. The anti-sway outriggers 130 and 132 each also include a pair of anti-sway protrusions 136 and 138 for interfacing with an adapter, described further below.

Figure 7:
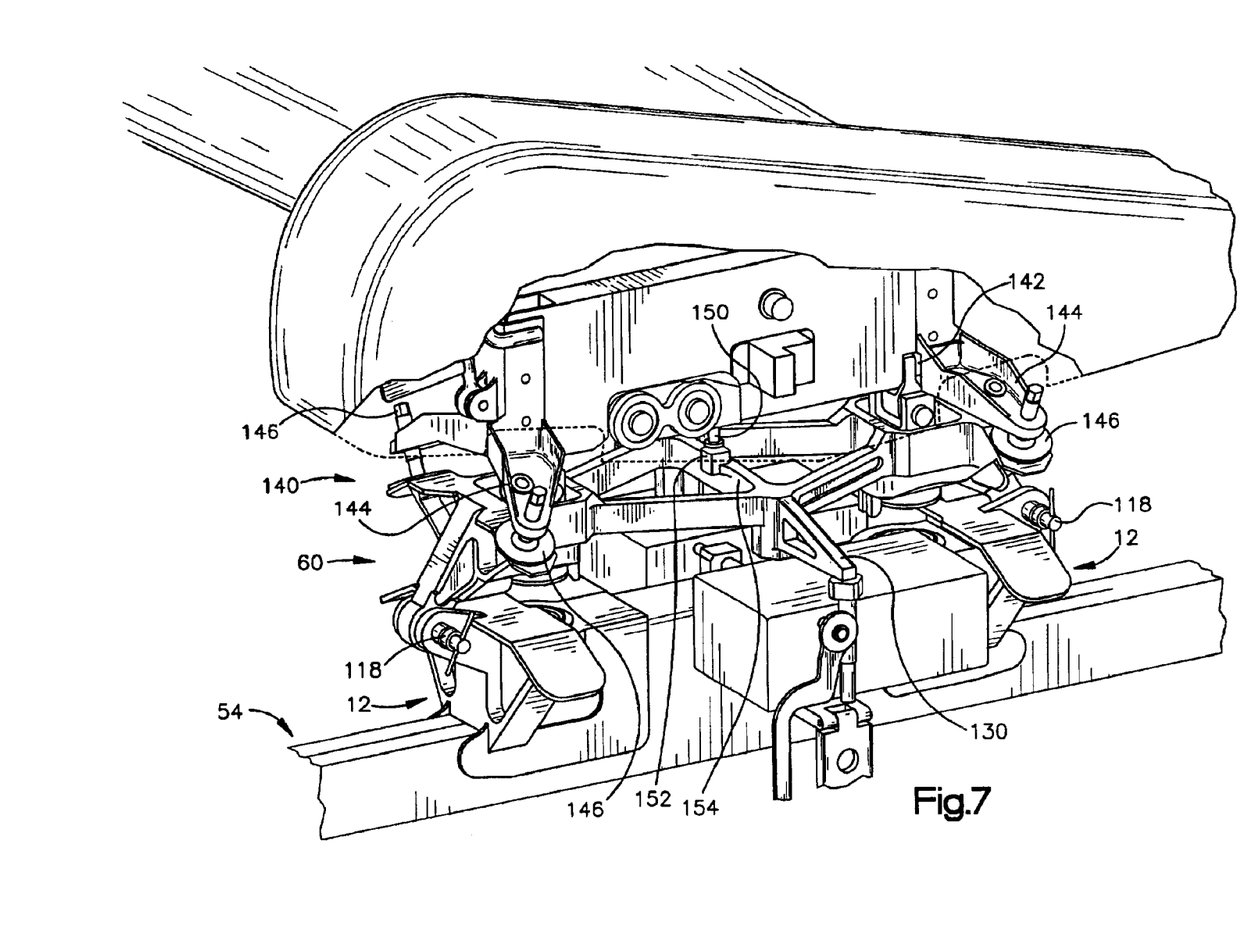
FIG. 7 is an oblique view of the mounting fixture and weapon set of FIG. 4, mounting to an aircraft mounting rack.

Turning now to FIG. 7, a view is shown of the mounting of the first weapon set 54 and the fixture 60 to an aircraft mounting rack 140. The mounting rack 140 includes mounting hooks or bars for receiving the lugs 64 and 66 of the fixture 60. One of these hooks is a hook 142 shown for interfacing with a lug 66.

The mounting rack 140 also includes sway braces 144, each having an adjustable anti-sway member 146. The hooks of the aircraft mounting rack 140 fit through the lug openings 90 and 92, thereby mechanically coupling the fixture 60 to the aircraft mounting rack 140. The adjustable sway members 146 may then be adjusted, for example, by turning screws through threaded holes in the sway braces 144, to press against the bracket extensions 126 of the bracket 62. This aids in preventing swaying of the bracket 62 and the fixture 60, relative to the aircraft 50.

The mounting rack 140 includes a jettison plunger 150 that interfaces with a jettison pad protrusion 152 on a main brace 154 of the bracket 62. The rack 140 includes a quick-jettison feature for jettisoning the fixture 60 and any weapon set, such as the weapon set 54, coupled thereto. For jettisoning, the hooks of the mounting rack 140 are retracted or otherwise disengaged from the lugs 64 and 66, and the jettison plunger 150 presses downward against the jettison pad protrusion 152, separating the fixture 60 and the weapon set 54 from the aircraft.

The jettison pad protrusion 152 may be able to provide an interface for a jack for supporting the aircraft, for example providing an interface at least equivalent to the jettison plunger 150, for example to permit weight and balance maintenance of the aircraft.

Once aligned, the mounting fixture 60 need not be removed when the weapon set 54 is swapped out, either for a similar weapon set of the same type, or a weapon set of a different type that may interface with the mounting fixture 60. Part or all of the mounting fixture 60 may be left on the aircraft mounting rack 140, even when no weapon set is connected to the mounting fixture. The quick-release pins may be tied or otherwise secured to the bracket 62. Thus, it will be appreciated that the need for re-boresighting may be greatly reduced by use of a fixture that includes an alignment mechanism that may be mechanically coupled to a weapon set. Moreover, the use of quick-release fasteners such as the quick-release pin facilitates easy installation and removal of the weapon set 54, thereby making the process of installing and removing weapon sets less time-consuming and thereby more expedient. Further, it will be appreciated that the mounting fixture 60, and in particular the bracket 62, advantageously interfaces with the weapon set mounts 10 already in use on the weapon set 54. Desirable anti-sway characteristics may be maintained through the mounting fixture 60, with the sway braces 144 of the aircraft mounting rack 140 interfacing with the bracket extension 146 of the bracket 62, and with the anti-sway outriggers 130 and 132 of the bracket 62 interfacing with corresponding parts on the weapon set 54.

Figure 8:
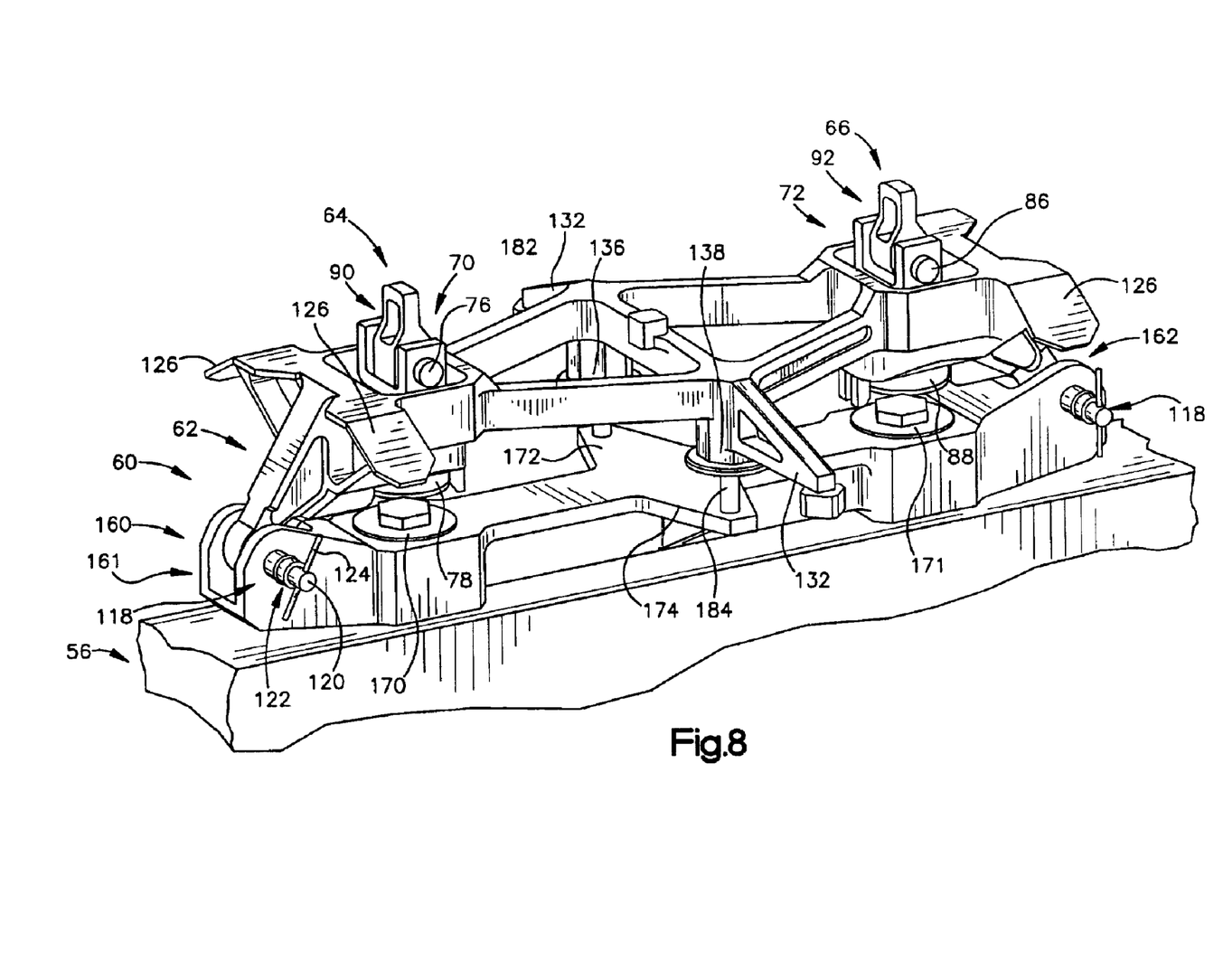
FIG. 8 is an oblique view of an alternative configuration of the mounting rack of FIG. 3, utilizing an adapter to interface with a different type of weapon set.
Figures 9, 10:
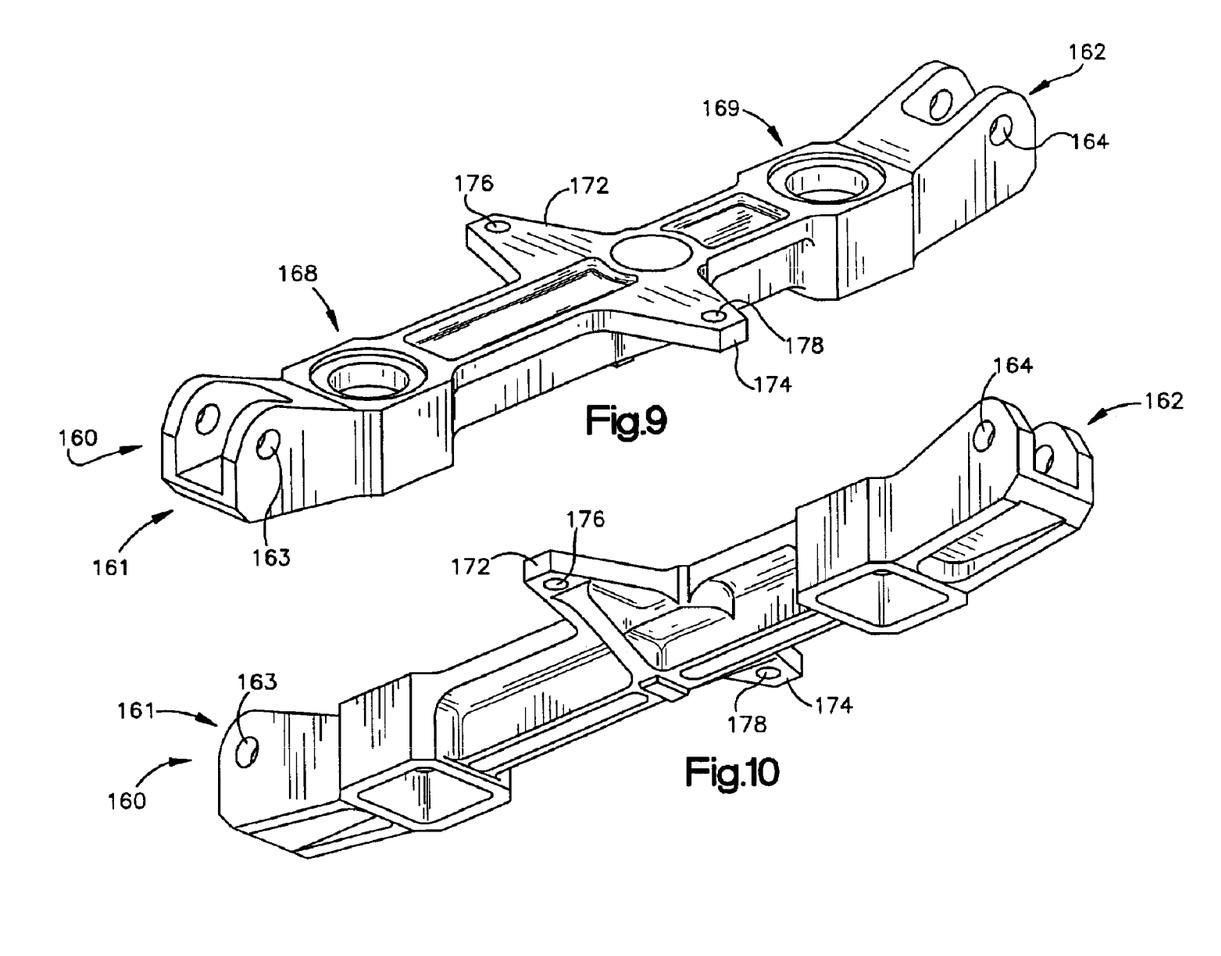
FIGS. 9 and 10 are oblique top and bottom views showing details of the adapter of FIG. 8.

Referring now to FIGS. 8–10, an adapter may be utilized as part of the mounting fixture 60, in order to interface with another weapon set, the weapon set 56. The adapter 160 provides similar connection points to the weapon set mount bodies 12 of the weapon set 54, thereby allowing coupling to the bracket 62 with the same quick-release fasteners. Thus the adapter 160 includes forked ends 161 and 162, having respective holes 163 and 164 therethrough (FIGS. 9 and 10), for receiving quick-release fasteners 118 (FIG. 8) for mechanically coupling the adapter 160 and the bracket 62 together.

The adapter 160 includes a pair of bolt holes 168 and 169 (FIG. 9) for receiving respective bolts 170 and 171 (FIG. 8). The bolt holes 168 and 169 may be configured to interface with existing cavities in the weapon set 56.

The adapter 160 includes anti-sway extensions 172 and 174, which have threaded holes 176 and 178 therein for receiving sway screws 182 and 184 (FIG. 8). The sway screws 184 may be tightened against the anti-sway protrusions 136 and 138 to reduce or prevent swaying of the weapon set 56 relative to the bracket 62.

The adapter 160 may be configured, for example, in thickness such that the proper alignment (boresighting) of the mounting fixture 60 for use with the weapon set 54, may also result in accurate boresighting when the weapon set 54 is coupled to the bracket 62 by the adapter 160.

The bracket 62, the lugs 64 and 66, and the adaptor 160 may be made of aluminum or another suitable material.

Use of the adapter allows easy switching between the weapon sets 54 and 56, without any need for re-boresighting. It will be appreciated that use of the quick-release fasteners also facilitates rapid swapping out of weapon sets.

It will be appreciated that other adapters may be configured to interface with the bracket 62, for mounting of other weapon sets, such as rocket pods or gun pods. The alignment requirements for some sorts of weapon sets may be lower than that required for missile weapon sets.

The mounting fixture and methods discussed above advantageously provide increased flexibility and efficiency with regard to swapping various weapon sets. This may facilitate combat readiness, and the ability to rapidly respond to changes in a battle environment, for example, by switching between different types of missiles rapidly, without a need for re-boresighting or other lengthy reconfiguration procedures.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An adjustable fixture for mounting any of a plurality of weapon sets to an aircraft, the fixture comprising:
   a bracket; and
   one or more mounting lugs adjustably mechanically coupled to the bracket;
   wherein the mounting lugs include aircraft-fixture connection points configured to mechanically connect to the aircraft;
   wherein the bracket includes fixture-weapon connection points configured to mechanically couple to the weapon sets via quick-release fasteners;
   wherein the lugs are adjustable relative to the bracket for adjusting orientation of the fixture-weapon connection points relative to the aircraft-fixture connection points; and
   wherein the bracket includes bracket extensions for interfacing with anti-sway brackets of the aircraft, to thereby control sway of the fixture relative to the aircraft.

2. The fixture of claim 1, wherein the bracket includes lug-receiving holes for receiving the lugs therein.

3. The fixture of claim 1, wherein the bracket includes fastener-receiving holes at opposite ends, for receiving the quick-release fasteners therethrough.

4. The fixture of claim 1, wherein the bracket extensions include respective pairs of the bracket extensions at opposite ends of the bracket.

5. The fixture of claim 1, wherein the mounting lugs are independently adjustable in at least two directions relative to the bracket.

6. The fixture of claim 1, wherein the quick-release fasteners include quick-release pins.

7. The fixture of claim 1,
   further comprising an adaptor for attachment to one of the weapon sets;
   wherein the adaptor is mechanically coupled to the bracket via the quick-release fasteners.

8. An adjustable fixture for mounting any of a plurality of weapon sets to an aircraft, the fixture comprising:
   a bracket; and
   one or more mounting lugs adjustably mechanically coupled to the bracket;
   wherein the mounting lugs include aircraft-fixture connection points configured to mechanically connect to the aircraft;
   wherein the bracket includes fixture-weapon connection points configured to mechanically couple to the weapon sets via quick-release fasteners;
   wherein the lugs are adjustable relative to the bracket for adjusting orientation of the fixture-weapon connection points relative to the aircraft-fixture connection points;
   wherein the bracket includes anti-sway outriggers for interacting with the weapon set to control sway of the weapon set relative to the fixture; and
   wherein the anti-sway outriggers include inboard surfaces configured for contacting with a first weapon set, and outboard contact surfaces configured for contacting a second weapon set.

9. The fixture of claim 8, wherein the bracket includes lug-receiving holes for receiving the lugs therein.

10. The fixture of claim 8, wherein the bracket includes fastener-receiving holes at opposite ends, for receiving the quick-release fasteners therethrough.

11. The fixture of claim 8, wherein the mounting lugs are independently adjustable in at least two directions relative to the bracket.

12. The fixture of claim 8, wherein the quick-release fasteners include quick-release pins.

13. The fixture of claim 8,
   further comprising an adaptor for attachment to one of the weapon sets;
   wherein the adaptor is mechanically coupled to the bracket via the quick-release fasteners.

14. An adjustable fixture for mounting any of a plurality of weapon sets to an aircraft, the fixture comprising:
   a bracket; and
   one or more mounting lugs adjustably mechanically coupled to the bracket;
   wherein the mounting lugs include aircraft-fixture connection points configured to mechanically connect to the aircraft;
   wherein the bracket includes fixture-weapon connection points configured to mechanically couple to the weapon sets via quick-release pins;
   wherein the lugs are adjustable relative to the bracket for adjusting orientation of the fixture-weapon connection points relative to the aircraft-fixture connection points;
   wherein the bracket includes fastener-receiving holes at opposite ends, for receiving the quick-release pins therethrough;
   wherein the bracket includes bracket extensions for interfacing with anti-sway brackets of the aircraft, to thereby control sway of the fixture relative to the aircraft;
   wherein the bracket includes anti-sway outriggers for interacting with the weapon set to control sway of the weapon set relative to the fixture; and
   wherein the mounting lugs are independently adjustable in at least two directions relative to the bracket.

15. The fixture of claim 14,
   further comprising an adaptor for attachment to one of the weapon sets;
   wherein the adaptor is mechanically coupled to the bracket via the quick-release fasteners.

16. The fixture of claim 15,
   wherein the adaptor includes a pair of forked ends that have fastener-receiving holes therethrough; and
   wherein the fastener-receiving holes of the adaptor and the fastener-receiving holes of the bracket are aligned at either end of the bracket to allow the quick-release pins to be placed therein, thereby coupling the bracket and the adaptor.

17. The fixture of claim 16, wherein the anti-sway outriggers include inboard surfaces configured for contacting with a first weapon set, and outboard contact surfaces configured for contacting a second weapon set.

18. The fixture of claim 17, further comprising sway screws that pass through holes in the adaptor and press against the inboard contact surfaces.

19. An adjustable fixture for mounting any of a plurality of weapon sets to an aircraft, the fixture comprising:

a bracket, wherein the bracket includes fixture-weapon connection points;

quick-release fasteners for coupling the weapon sets to the fixture-weapon connection points of the bracket;

a pair of mounting lugs mechanically coupled to the bracket, wherein the mounting lugs include aircraft-fixture connection points configured to mechanically connect to the aircraft; and respective pairs of threaded adjusters coupled to each of the lugs, for independently adjusting the bracket relative to the connection points in either of a pair of different directions.

20. The fixture of claim 19, wherein the threaded adjusters adjust the relative to the connection points in either of a pair of substantially orthogonal directions.

21. The fixture of claim 19, wherein the threaded adjusters for each of the lugs are substantially orthogonal to each other.

22. The fixture of claim 19, wherein the bracket includes bracket extensions for interfacing with anti-sway brackets of the aircraft, to thereby control sway of the fixture relative to the aircraft.

23. The fixture of claim 22, wherein the bracket extensions include respective pairs of the bracket extensions at opposite ends of the bracket.

24. The fixture of claim 19, wherein the bracket includes anti-sway outriggers for interacting with the weapon set to control sway of the weapon set relative to the fixture; and wherein the anti-sway outriggers include inboard surfaces configured for contacting with a first weapon set, and outboard contact surfaces configured for contacting a second weapon set.

25. The fixture of claim 19, wherein the bracket includes lug-receiving holes for receiving the lugs therein.

26. The fixture of claim 19, wherein the bracket includes fastener-receiving holes at opposite ends, for receiving the quick-release fasteners therethrough.

27. The fixture of claim 19, wherein the quick-release fasteners include quick-release pins.

* * * * *